United States Patent [19]

Marathe et al.

[11] 4,080,009

[45] Mar. 21, 1978

[54] SERVOSTATIC BEARING SYSTEM WITH VARIABLE STIFFNESS

[75] Inventors: Sharad M. Marathe; Bruce C. Cuppan; Orville W. Ehrhardt; Joseph C. Scherer, all of Fond du Lac; Thomas E. Schmitz, St. Cloud, all of Wis.

[73] Assignee: Giddings & Lewis, Inc., Fond du Lac, Wis.

[21] Appl. No.: 727,938

[22] Filed: Sep. 29, 1976

[51] Int. Cl.² .................................................. F16C 32/06
[52] U.S. Cl. .................................... 308/3.5; 308/3 A; 308/5 R
[58] Field of Search ............... 308/3 A, 3.5, 5 R, 5 V, 308/9, 122; 184/5; 137/503; 29/201 R

[56] References Cited

U.S. PATENT DOCUMENTS

| | | | |
|---|---|---|---|
| 3,260,162 | 7/1966 | Atherton | 308/5 R X |
| 3,407,012 | 10/1968 | Siebers | 308/122 |
| 3,442,560 | 5/1969 | DeGast | 308/5 R |
| 3,717,392 | 2/1973 | Ennis | 308/5 R |

*Primary Examiner*—Trygve M. Blix
*Assistant Examiner*—Douglas C. Butler
*Attorney, Agent, or Firm*—Leydig, Voit, Osann

[57] ABSTRACT

The invention provides a hydraulically sealed, variable stiffness servostatic bearing system for use in machine tools and between any other loaded surfaces. Bearing pads operate between two relatively movable surfaces. A pilot valve senses changes in the bearing surface spacing and communicates by pressure variations with a diaphragm controlled restrictor valve. The diaphragm controlled restrictor valve apportions proper amounts of hydraulic fluid at proper pressure to the bearing pads. The combination results in a bearing system the stiffness of which is adjustable from positive to infinite to negative by the source hydraulic pressure to the diaphragm restrictor valve. A lift bladder and a modular bearing pad assembly to facilitate easy and quick installation and removal of bearing pads are also described.

9 Claims, 11 Drawing Figures

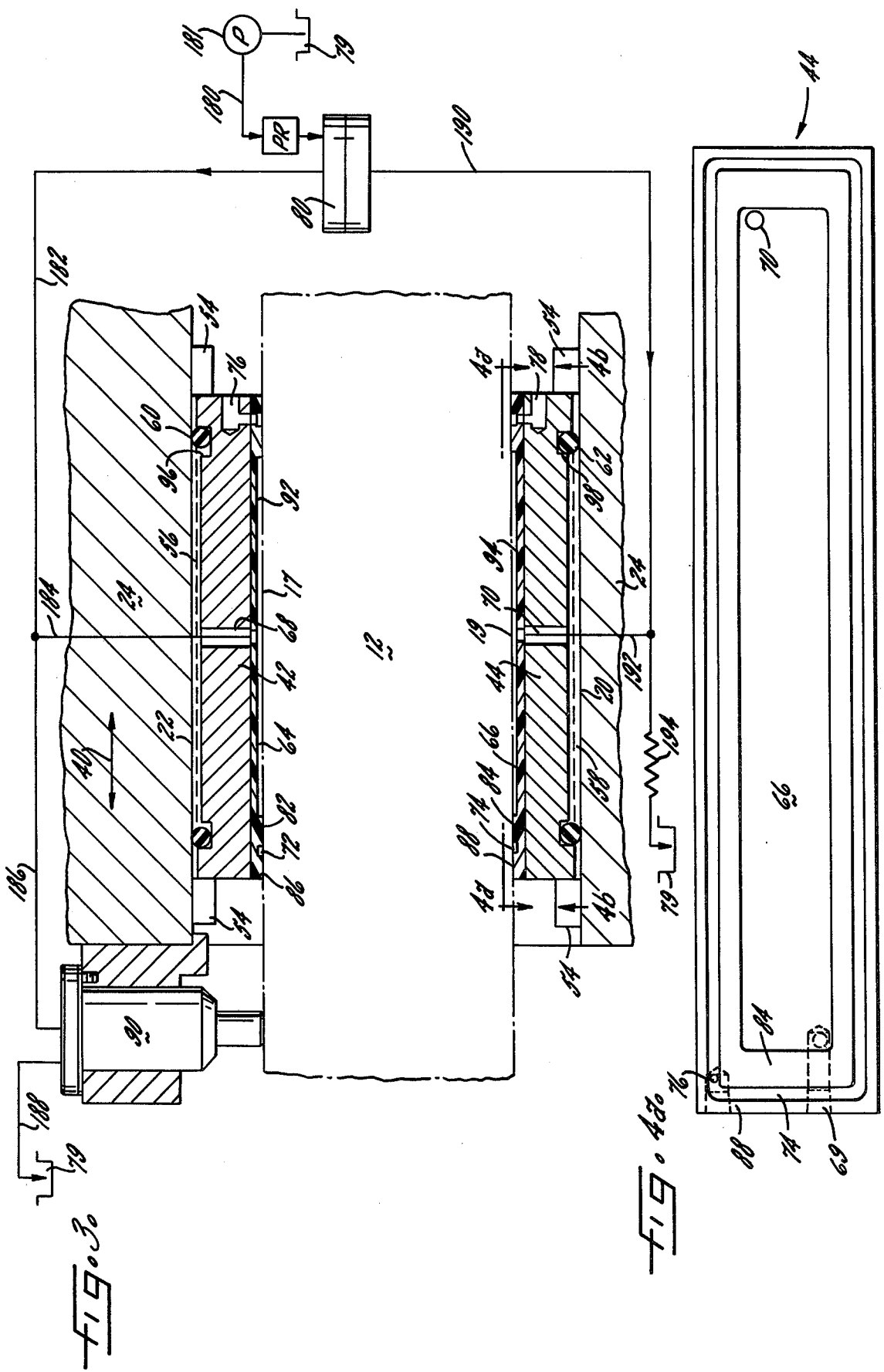

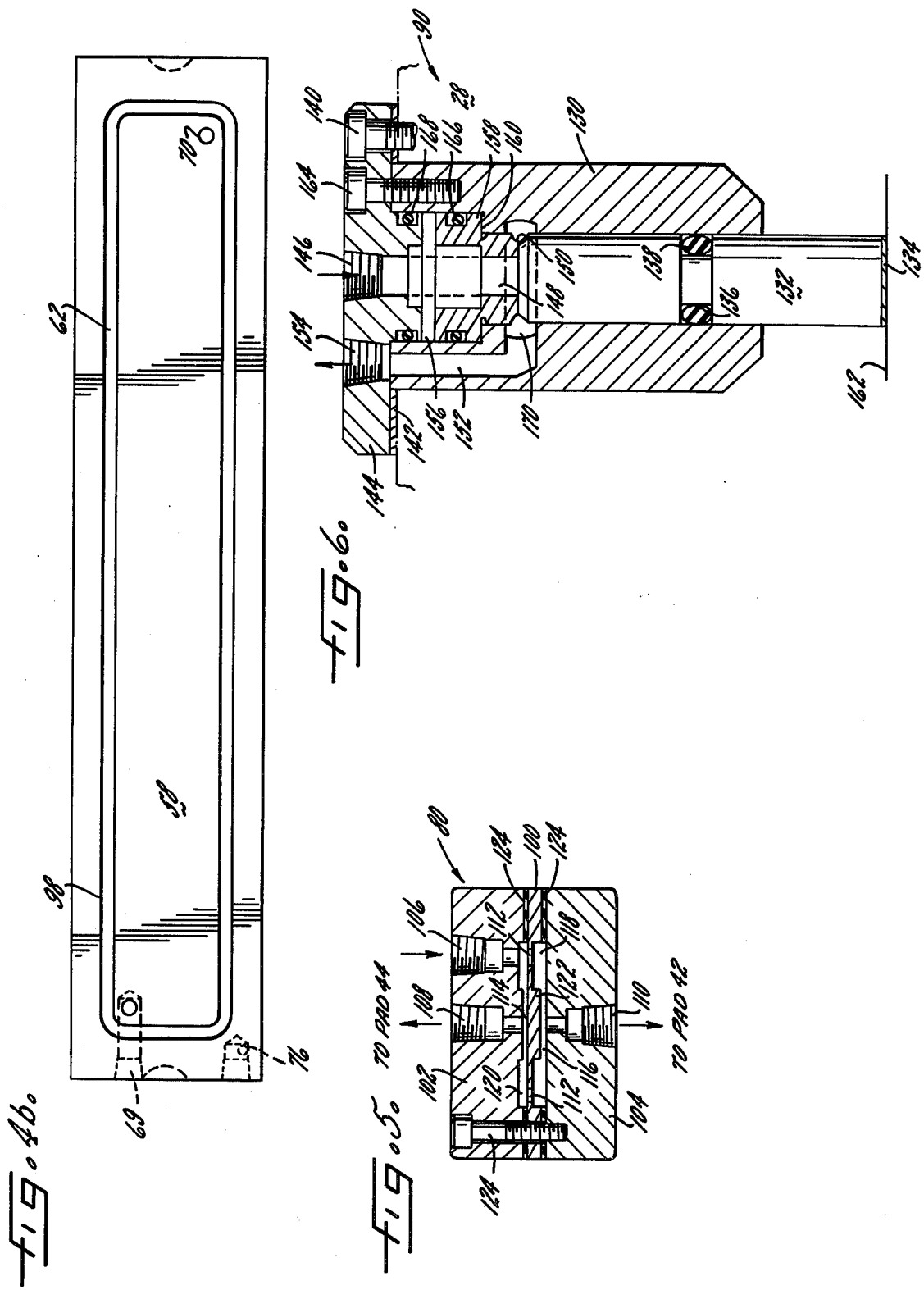

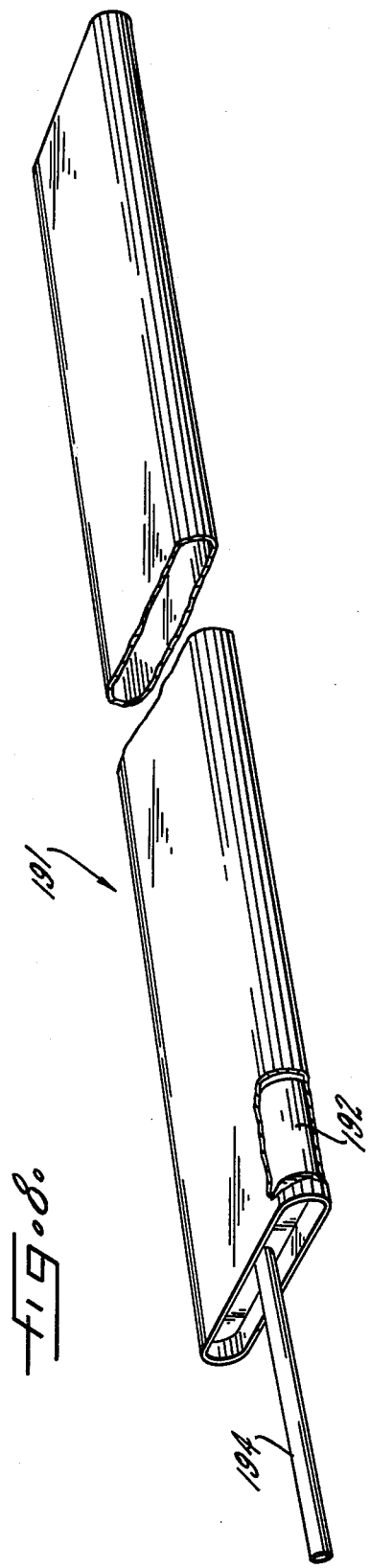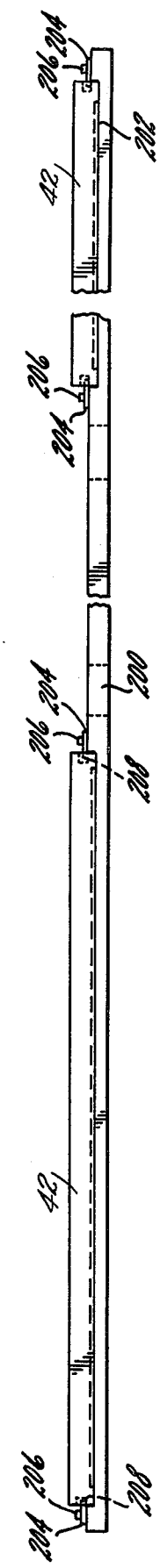

SERVOSTATIC BEARING SYSTEM WITH VARIABLE STIFFNESS

BACKGROUND OF THE INVENTION

The present invention relates to hydrostatic bearings, and particularly, but not exclusively, as applied to machine tools.

For high precision machining, it is imperative that the workpiece be held near perfectly stable or be moved through extremely precise motion increments while a tool is operating upon the workpiece, such as, for example, in milling, drilling, or punching operations. Thus, the slide or table upon which the workpiece is positioned must be capable of resisting the high forces imposed upon the workpiece by the tool without deforming or deflecting in any way. At the same time, the slide must be movable along the machine way in a smooth and efficient manner.

A number of different bearing systems have been devised to meet such requirements. Among hydrostatic bearings, a typical example is the classical system in which a high pressure oil film separates two bearing surfaces. The oil is supplied to the bearing by means of a high pressure oil source. It flows through the bearing, dropping in pressure to atmospheric upon exiting from the space between the bearing surfaces.

One disadvantage to such "open" system is that it provides no means of controlling the relative position of the bearing members. There is no feedback which adjusts the flow to the bearings so as to maintain a constant bearing gap. As a result, the stiffness of such system, i.e. the change in oil film thickness brought about by a change in load conditions, is affected by accuracy deviations in the way surfaces, structural deformations due to machine loads, and thermal deformation.

Additionally, no provision is made for the recovery of the hydraulic fluid in an open system. Upon flowing out of the bearing onto the way surfaces, it becomes contaminated and is lost from the system.

It is, accordingly, an object of the present invention to provide a servostatic bearing system which is hydraulically closed and possesses a variable stiffness capability.

Another object of the invention is to provide a servostatic bearing system having a completely closed hydraulic circuit and precise control of stiffness utilizing continuous feedback to the fluid distribution means of pressure changes due to changes in load conditions.

A further object of the invention is to provide a hydraulically closed, variable stiffness bearing system for use with machine tools, such that the bearing system stiffness may compensate for the insufficient stiffness of the other components of the machine tool, producing a machine tool capable of being adjusted to any desired stiffness.

Another object of the invention is to provide a servostatic bearing system for use with machine tools which does not require specially hardened machine way surfaces permits greater manufacturing tolerances in machine components than in machines heretofore known, and minimizes alignment problems in the machine components.

A further object of the present invention is to provide a servostatic bearing system utilizing a minimum number of components, each of simple construction, so that manufacturing costs are kept advantageously low.

Still another object of the invention is to provide a servostatic bearing system utilizing a modular construction which affords maximum ease of assembly and maintenance of the bearing pads.

Other objects and advantages of the invention will become apparent from the description following below.

SUMMARY OF THE INVENTION

The servostatic bearing system embodying the present invention comprises bearing pads inserted between and separating two relatively movable surfaces. Pockets and recesses in the bearing pads facing the surfaces are filled with hydraulic fluid at a given pressure, thereby supporting the substantial part of the load. The proper bearing surface spacing is continuously monitored by a pilot valve, and adjustments are made by the pilot valve acting in conjunction with a diaphragm flow restrictor in controlling fluid flow to and from the pads. For ease of discussion, the servostatic bearing system may be subdivided into three principal components, namely, the pads, the hydraulic system, and the control system.

Each bearing pad is mounted between two relatively movable members and fixed to one of them. On one face, the pad has a relatively large pocket defined by an O-ring which seals against fluid leakage out of the pocket. On the opposite face of the pad, a relatively large recess is machined into a layer of low friction material bonded to the pad. A land surrounds the recess which, when forced by hydrostatic pressure against the bearing surface facing it, provides the sealing mechanism. A narrow groove around the land collects any fluid which may migrate across the sealing land. The fluid collected in the groove is returned to the pump reservoir. The pocket and recess are hydraulically connected by means of a port extending transversely through the pad.

During operation of the bearing, the pocket and recess are filled with hydraulic fluid under sufficient pressure to maintain the bearing surfaces in a predetermined spaced relationship. A pump provides pressure to a diaphragm controlled restrictor, which distributes a proper fraction of the supply pressure to each of two opposing bearing pads. Pressure reduction and flow adjustment are achieved by a pressure-variable gap between a segment of the valve body and a land on a flexible diaphragm.

In order to maintain the proper bearing surface spacing, a pilot valve is provided rigidly attached to one of the bearing surfaces. The pilot valve operates in parallel to one of the pads, providing a position sensing function. A downward load applied to the machine slide tends to reduce a gap between the pilot valve body and a plunger which rides on the slideway. The result is an increase in the pressure across this gap which then causes the pressure at the corresponding bearing pad to increase. The highest pressure acts on the diaphragm controlled restrictor valve in such a way that the bearing pad with the higher pressure will receive increased oil flow while at the same time the opposite bearing pad will receive comparably less. As a result, the slide will slightly lift, increasing the sensed bearing surfaces spacing until a pre-set valve gap is reached. In short, the sensing properties of the pilot valve and the compensating properties of the diaphragm controlled restrictor valve operate as a "closed loop" bearing system. The pilot valve continuously monitors the position of the bearing surfaces.

While it may be possible in particular applications to use a single bearing pad operating alone, opposing bearing pad pairs are most commonly utilized for precise control of machine way slides. In those applications, since one pilot valve is sufficient to fix the position of the slide table vis-a-vis the slide way surface, a restricting device, such as a capillary restrictor, is utilized in conjunction with the opposing pad to provide a balanced oil flow to both sides of the diaphragm controlled restrictor valve. Flow at one side takes place through the pilot valve, and at the other through the fixed restrictor. Any flow through such restrictor is returned to the pump reservoir.

Given a particular bearing system configuration, the stiffness of the system is a function of the source hydraulic pressure.

Thus, it may be controlled merely by manipulating a pressure regulating means. One particular bearing sytem may therefore be incorporated into a number of different table-type machining centers operating under generally similar load condition to produce, in each of them, any desired stiffness properties. One need only adjust a pressure regulator in the source hydraulic fluid line to obtain positive, negative, or zero deflection and deformation as between tool and workpiece.

An additional feature of the invention facilitates easy changeout of the bearing pads. According to the invention, a bladder is inserted between the machine slide and the machine way, which, when subsequently inflated sufficiently separates the two bearing surfaces so that bearing pads may be inserted easily and without damaging the seals.

To yet further ease the exchange of bearing pads, any number of pads may be mounted onto a bar forming a bearing pad module. Such module facilitates pressure testing of the O-ring seals prior to installation and completely protects the O-rings during installation. The entire bar is inserted and becomes part of the slide as a unit. Not only are seal failures largely eliminated, but considerable installation time is also saved.

BRIEF DESCRIPTION OF THE DRAWINGS

The invention will be described more fully with reference to the several embodiments thereof illustrated in the accompanying drawings, in which:

FIG. 3 is a further enlarged diagrammatic vertical sectional view through a part of the bearing system.

FIGS. 4a and 4b are top and bottom plan views, respectively, of one of the bearing pads shown in FIG. 3.

FIG. 5 is an enlarged sectional view through a diaphragm controlled restrictor valve used in the system of the invention.

FIG. 6 is an enlarged sectional view through a pilot valve used in the system.

FIG. 8 is a perspective view of a lift bladder used with the system.

FIG. 9 is a longitudinal sectional view of a bearing pad module.

Figure 1:
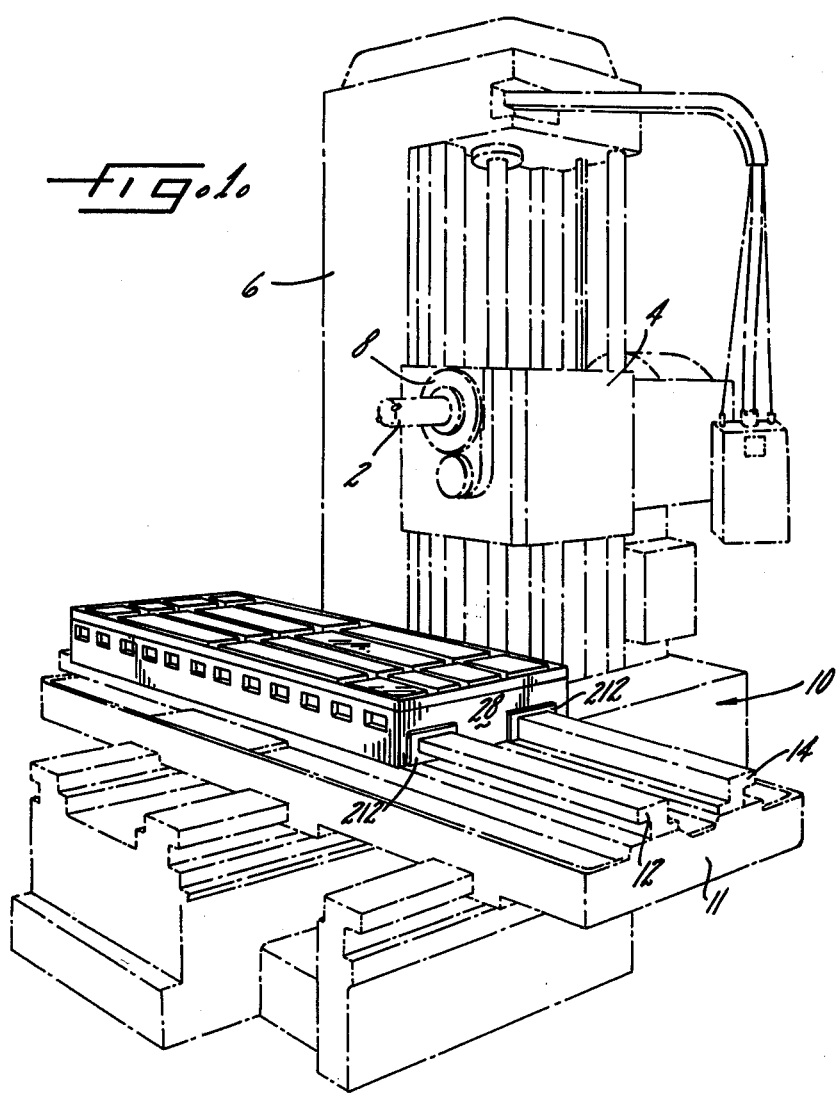
FIG. 1 is a perspective view of an illustrative machine tool having a machine table and slide ways embodying the present invention.

While the invention is susceptible of various modifications and alternative constructions, a certain illustrative embodiment has been shown in the drawings and will be described below in considerable detail. It should be understood, however, that there is no intention to limit the invention to the specific form described but, on the contrary, the intention is to cover all modifications, alternative constructions and equivalents falling within the scope of the appended claims.

DETAILED DESCRIPTION OF THE INVENTION

General

Figure 2:
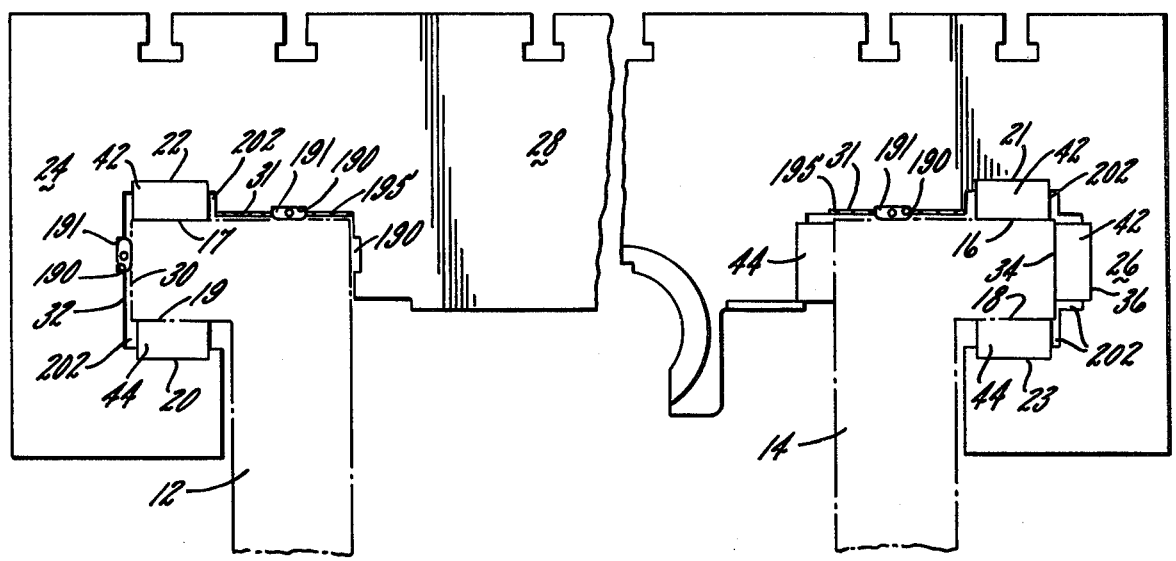
FIG. 2 is an enlarged diagrammatic vertical sectional view taken transversely through the saddle ways and the table supported thereon.

Referring more specifically to FIGS. 1 and 2, the invention is there exemplified in a typical way bearing structure 10 of a horizontal boring, drilling and milling machine. The structure 10 includes a pair of support ways 12, and 14 each of inverted L-shaped cross section fixed to the top of saddle 11. The ways 12, 14 define both top and bottom bearing surfaces 16, 18 and 17, 19 facing away from each other. These bearing surfaces mate with their counterpart bearing surfaces 21, 23 and 20, 22 defined, respectively, in laterally spaced portions 24, 26 of slide or table 28. The slide is thus supported from below, as well as being constrained against lifting or tipping.

To assure proper lateral alignment, bearing surfaces 34 and 36 mate in a plane perpendicular to that of bearing surfaces 17, 22 and 19, 20, as well as 16, 21 and 18, 23 (see FIG. 2). The vertically oriented bearing surfaces may be supported by the servostatic bearings of this invention in much the same manner as will be described hereinbelow in conjunction with the horizontally oriented bearing surfaces. It should be noted that the start-up operation is slightly different as there is no dead weight resting on the vertically oriented way surfaces.

FIG. 2 contains a cross section through the L-shaped support ways 12, 14, while FIG. 3 shows a partial cross section longitudinally along machine way 12. Bearing pads 42 and 44 separate the machine way upper bearing surface 17 and lower bearing surface 19 from the upper bearing surface 22 and lower bearing surface 20 of the C-shaped cross section portion 24 of machine slide 28. Bearing pads 42 and 44 are secured against lateral movement by their location within recesses 202 (FIG. 2), or by means of retaining bars 54 which are rigidly mounted to slide 28 (FIG. 3). Machine slide 28 is moveable in direction 40.

Between floating bearing pad 42 and upper and lower bearing surfaces 22 and 17 of the C-shaped cross section portion 24 of slide 28 there are pockets 56, 58 sealed by O-rings 60, 62 (see FIG. 3 and 4). Such pockets 56, 58 communicate with corresponding recesses 64, 66 on the respective opposite sides of the bearing pads 42, 44 via ports 68, 70. Recesses 64, 66 are surrounded around their circumferences by narrow grooves 72, 74. Said narrow grooves 72, 74 communicate via outlet ports 76, 78 with an hydraulic fluid supply reservoir 79. Hydraulic fluid supply lines 180, 182, 184 and 190, 192 connect pockets 56 and 58 to a pump 181 via a diaphragm controlled restrictor valve 80, which apportions the hydraulic fluid flow from the pump to the respective pockets 56, 58. Because of ports 68 and 70, there is fluid flow into recesses 64 and 66. While the O-ring seals 60, 62 prevent any leakage out of pockets 56, 58, recesses 64 and 66 are sealed by lands 82, 84 and 86, 88 enclosing grooves 72 and 74. Any fluid leaking across lands 82, 84 is trapped in grooves 72, 74, and is returned to oil reservoir 79. The oil pressure in grooves 72 and 74 is normally at such low level that leakage across lands 86 and 88 is virtually eliminated.

Rigidly attached to machine slide 28 is a pilot valve 90 whose purpose is to maintain the proper spacing between the bearing surfaces 17 and 22, and thereby also between the bearing surfaces 19 and 20, since the sum of the spacing between the respective surfaces is a constant.

Pilot valve 90 and flow restrictor 194 are connected in parallel with pads 42 and 44, respectively. Pilot valve 90 continually monitors the spacing between bearing surfaces 17 and 22. When the spacing becomes greater than normal (the spacing between surfaces 19 and 20 then being less than normal), it diverts flow away from pocket 56 and recess 64. The resultant drop in pressure in conduits 184 and 182 in turn causes the diaphragm control restrictor 80 to provide more fluid to pocket 58 and recess 66 of pad 44. The net result is a slight movement of slide 28 downward, causing the spacing between surfaces 17 and 22 to adjust to its proper dimension.

Valve 90 reverses the process described above when the spacing between surfaces 17 and 22 is less than normal.

Further structural and operational details of pilot valve 90 are described below.

The Hydrostatic Bearing Pad

FIGS. 4a and 4b show the construction of hydrostatic bearing pads, using, as an example, pad 44. The pad is of essentially conventional construction. While for purposes of this description rectangularly shaped embodiments are discussed, it is to be noted that the pad may be constructed in various geometric configurations. The inside of pad 44, that side of the bearing pad facing machine way 12 (see FIGS. 3 and 4), is coated with a thin layer of a low friction, nonmetallic sealing material 94. Into such layer 94, recess 66, as well as groove 74 is machined, preferably such that the depth of the recess and groove does not exceed the thickness of the sealing material. Suitable ports 70 and 76 are bored into the recess 66 and groove 74, respectively. Proper fittings provide for connection with the respective supply or return lines. Land 84 separating recess 66 and groove 74 provides the primary sealing mechanism to contain the hydraulic fluid within said recess.

The outside of bearing pad 44, that is that side of the pad facing machine slide 28 (see FIG. 4b), is provided with a pocket 58 defined by O-ring groove 98. At least one port 70 establishes communication between recess 66 and pocket 58. An O-ring 62 encloses pocket 58 and seals against leakage out of the recess onto the bearing surfaces.

The area of pocket 58 enclosed by O-rings 62 is larger than the area of the recess 66 enclosed by land 84. Upon pressurization of the pocket and recess, therefore, the resultant net force urges bearing pads 42, 44 toward the inside, that is toward the machine way bearing surfaces 17 and 19. O-rings 60, 62 have such elastic properties, and grooves 96, 98 in which O-rings 60, 62 rest, are so dimensioned that despite the slight movement of the pads toward machine way 12, effective sealing of pockets 56 and 58 as against bearing surfaces 22 and 20 is maintained.

At the inside surfaces of bearing pads 42, 44 there is movement of machine slide 28 with respect to machine ways 12. To facilitate such movement with lowest possible friction, and yet while maintaining proper sealing, the twin seal lands 82, 86 and 84, 88 surround recess 64 and 66. Sealing material 92, 94 is designed such that it easily adapts to the roughness of the machine way surface while maintaining its sealing properties. Groove 72, 74 is provided to capture any flow, even though such amounts to only very minute quantities, of hydraulic fluid across lands 82, 84. As any escaping hydraulic fluid substantially dissipates its pressure in migrating across lands 82, 84, there is no further tendency of the fluid to leak across lands 86, 88, so that substantially all of the fluid leaking across lands 82, 84 is recovered in grooves 72, 74 to be rerouted into the hydraulic system via exit ports 76, 78.

The bearing pads 42, 44 operate as follows. Hydraulic fluid is pumped into pocket 56 and 58, and then through port 68 and 70 into recesses 64 and 66. The pressure of the hydraulic fluid acting over an area of pocket 56 and 58 which is larger than the area of recess 64 and 66 produces a differential force urging the bearing pad inwardly toward machine way 12. This, in turn, causes lands 82, 86 and 84, 88 to seat tightly against the machine way bearing surface 17 and 19. The upper segment of the C-shaped cross section portion 24, of machine slide 28 also slightly lifts away from bearing pad 42 by the action of the force generated as a result of hydraulic pressure introduced into pocket 56. At the same time the lower segment of the C shaped cross section portion 24, of machine slide 28 slightly moves toward the machine way 12, 14. As mentioned above, such slight movement of the machine slide is well within the elastic limits of O-rings 60, 62 so as to maintain their sealing properties. The precise amount of movement of the machine slide with respect to the machine way is controlled by pilot valve 90, which is described below.

The Diaphragm Controlled Restrictor Valve

The diaphragm controlled restrictor valve 80 (FIG. 5) serves to supply each of the cooperating pads 42, 44 (see FIGS. 2 and 3) of a pair of bearing pads with proper amounts of hydraulic fluid at proper pressures in order to maintain the preset spacing between bearing surfaces 17 and 22, and thereby also between surfaces 19 and 20.

The valve basically consists of two end plates 102 and 104 bolted together by means of bolts 124. Between said end plates 102 and 104 a diaphragm 100 is positioned which at its center has a land 122. Both sides of diaphragm central land 122 face end plates 102 and 104, forming two corresponding flow restrictions 114 and 116. Outlet ports 108 and 110 communicate between said flow restrictions and the respective outside surfaces of end plates 102 and 104. Radially outward from the flow restrictions 114 and 116 there are pressure equalization chambers 118 and 120. The pressure equalization chambers 118 and 120 are of annular shape and are in communication with each other by means of pressure equalization ports 112 extending through diaphragm 100.

A separate inlet port 106 permits communication from hydraulic fluid pump 181 to pressure equalization chambers 118 and 120.

The operation of the valve is as follows. Hydraulic fluid at a regulated pressure enters inlet port 106, fills pressure equalization chamber 120 and also pressure equalization chamber 118 through equalization port 112. It then flows radially inward through flow restrictions 114 and 116, exiting via respective outlet ports 110 and 108. Said outlet ports communicate with the intake ports 69 (see FIG. 4b) of the bearing pads, as well as with pilot valve 90 and flow restrictor 194.

Because of the restricted cross section flow area opposite the diaphragm central land 122, the original inlet pressure is reduced to some fraction thereof at the time the hydraulic fluid exits through outlet ports 108 and 110. The precise amount of pressure drop is a function of the precise dimension of the flow restrictions 114 and 116. Said flow restrictions in turn are adjustable by means of the emplacement of shims 124 having particular widths. Said shims are preferably fabricated in a number of different colors, each corresponding to a particular width and therefore to a particular flow restriction size.

In a no-load operational state, the hydraulic fluid passing through the diaphragm controlled restrictor valve 80 and into the pockets and recesses of the bearing pads reaches a certain equilibrium condition in which there is some slight flow through pilot valve 90 and flow restrictor 194 connected in parallel to pads 42 and 44. Fluid flow through the bearing pads themselves, that is across land 82, 84 into groove 72, 74 and back to the pump reservoir, is negligible.

If now a load is imposed upon machine side 28, tending to reduce the spacing between bearing surfaces 17 and 22 and to increase the spacing between bearing surfaces 19 and 20, the fluid pressure in the recesses of bearing pad 42 increases while that in the recesses of bearing pad 44 decreases. These pressure flunctuations are transmitted to the diaphragm controlled restrictor valve 80 and there manifest themselves by deflecting diaphragm center land 122 in the direction of lessened hydraulic fluid pressure, that is in the direction of outlet port 108 communicating with bearing pad 44. Such flexing of the diaphragm 100 in turn causes an increase in size of the flow restriction 116 opposite outlet port 110 communicating with bearing pad 42 experiencing the higher hydraulic pressure. When flow restriction 116 increases in size, more hydraulic fluid is permitted to flow therethrough to the pocket and recess of bearing pad 42, tending to separate bearing surfaces 17 and 22 to their predetermined spacing. At the same time, because of the reduced cross sectional area of flow restriction 114, less fluid flows to the lower pressured bearing pad 44, tending to decrease the separation of bearing surfaces 19 and 20. In summary then, the diaphragm control restrictor valve 80 operates to supply the respective bearing pads 42, 44 with proper amounts of hydraulic fluid at proper pressures in order to maintain a certain predetermined spacing between bearing surfaces 17 and 22, and 19 and 20.

The Pilot Valve

While the diaphragm controlled restrictor valve 80 apportions the hydraulic fluid flow to the respective bearing pads, pilot valve 90 has the function of monitoring the spacing between the bearing surfaces, and to initiate flow toward one or the other of two cooperating bearing pads, or to terminate such flow, in order to adjust the spacing to the predetermined position.

The valve consists of a valve body 130 (see FIG. 6), which surrounds and holds plunger 132. Said plunger is held in the bore of valve body 130 by means of O-ring 138 installed in O-ring groove 136 machined around the circumference of the plunger. The bottom surface of plunger 132 contains low friction coating 134 so as to enable the plunger to easily slide across a base surface 162.

Pilot valve 90 is attached to the machine table or slide 28 by fastening means such as bolt 140. Said bolt extends through cover plate 144 and spacer shim 142 into the body of machine slide 28. The width of spacer shim 142 is chosen such that with the hydraulic fluid supply turned off, plunger 132, when in contact with reference surface 162, also engages the lower surface of piston 158. Cover plate 144 extends across the top portion of valve body 130, and is bolted thereto by means of bolts 164.

An inlet port 146 is bored near the center of cover plate 144 and communicates with chamber 156. A piston 158 containing bore 148 is slideably mounted within chamber 156, and is sealed against leakage by means of O-ring seals 166. Similarly, chamber 156 is sealed against leakage through the cover plate 144 by means of O-ring seal 168. When the valve is in operation, that is when hydraulic pressure is applied through inlet port 146, the piston 158 will be in the down position, as shown in FIG. 6, because pressure will be acting upon the annular top surface of piston 158 causing a net force downward. Piston 158 is limited in its downward movement by abutment 160. The precise function of piston 158 will be explained below.

The port extending through piston 158 communicates with annular chamber 170. Said chamber surrounds flow restriction 150 which is defined by the top surface of plunger 132 and the lower annular surface of piston 158. An outlet bore 152 connects outlet port 154 with the annular chamber 170.

Pilot valve 90 is designed to maintain the proper spacing between reference surface 162 and machine slide 28 by means of restricting and allowing flow of hydraulic fluid through the variable flow restriction 150. Reference surface 162 may be any surface or other datum plane with respect to which the movable machine table's position is adjusted. For ease of discussion, such reference surface shall be the top surface 17 of slideway 12.

In an initial shutdown position, i.e. in the situation where machine slide 28 rests upon machine ways 12 and 14, the weight of the machine slide will slightly compress O-ring 60. The slide, therefore, rests in a relatively lower position on machine ways 12 and 14 than when the hydraulic system is in operation with the hydraulic fluid supporting the load. In such collapsed position, valve body 130 relative to plunger 132 is moved downward thereby reducing flow restriction 150 to the extent of entirely closing it. In order that no extreme machine tolerances be required, piston 158 is capable of some movement upward in order to accomodate relative upward movement of the top surface of plunger 132 to a position higher than the lower annular surface of piston 158 when seated against abutment 160. In that case, plunger 132 simply seats against piston 158, and any further movement upward causes piston 158 to retract upward. Such design not only prevents damage to the surfaces defining flow restriction 150, but also to coating 134 and reference surfaces 162. Of course, on vertical way systems, the effect of such dead weight loads is not a problem.

Upon pressurization of the system, the diaphragm controlled restrictor 80 will permit fluid to flow to both bearing pads 42 and 44, which pockets 56, 58 and recesses 64, 66 will quickly fill up, and thereafter exert a back pressure onto the pilot valve 90 as well as the diaphragm controlled restrictor 80. During the initial stage of pressurization, plunger 132 of pilot valve 90 is in contact with the lower surface of piston 158, completely sealing flow restriction 150. All flow therefore from the diaphragm controlled valve 80 is directed into the bearing pads. The pad on the pilot valve side is filled first because flow restriction 150 is closed. The result is a slight lifting of machine slide 28, and an increase, therefore, in the spacing between bearing surface 17 and bearing surface 22. Such slight lifting in turn will move valve body 130 in an upward direction relative to plunger 132. Because piston 158 is initially seated against abutment 160, the relative downward movement of plunger 132 will cause an opening of flow restriction 150 permitting some flow through the restriction, and through outlet bore 152 to the pump reservoir via outlet port 154. Because the pilot valve is connected in prallalel with bearing pad 42, the opening of flow restriction 150 will cause some of the flow which would otherwise be directed to bearing pad 42 to flow through the restriction and return to the fluid reservoir. The consequent lessening of hydraulic fluid pressure causes the diaphragm controlled restrictor valve to direct less flow to bearing pad 42, halting any further lifting of slide 28, which in turn will cause flow restriction 150 to assume a stable position. The system has now reached an equilibrium state at which it will remain until the system is either turned off, or experiences a change in load.

When the system has achieved an equilibrium state with a load applied to it, and such load is either removed altogether or reduced to some extent, machine table 28 will tend to slightly rebound upwards. Such rebounding translates at the pilot valve 90 to an increase in the gap of flow restriction 150 causing an additional amount of flow to be diverted from bearing pad 42 through valve 90 into the hydraulic fluid reservoir. In effect, some fluid is extracted from bearing pad pocket 56 and recess 64 permitting the slide to slightly drop until again a preset gap between surfaces 17 and 22 is achieved. At that point plunger 132 will again have reduced the gap of flow restriction 150 to a point at which an equilibrium flow condition is established.

It should also be noted that whenever the flow restriction 150 opens, a pressure drop is experienced at the inlet port 146 side of the valve, which pressure drop is communicated to the diaphragm controlled restrictor valve 80. As discussed above, such pressure drop will tend to move the diaphragm land 122 into the direction of lower pressure, causing an increased amount of flow to the higher pressured pad, in this case pad 44. As a result, the spacing between machine way bearing surface 17 and machine slide bearing surface 22 will tend to decrease, returning the machine slide to its proper position with respect to the machine way 12. The operation of the system as a whole will be explained in greater detail below.

The Operation Of The Bearing System

The structure and operation of the various components having been discussed above, the precise operation of the entire system will here be described.

When the hydraulic fluid supply pump is shut down, i.e. with the system entirely turned off, table 28 (see FIGS. 2 and 3) by virtue of its weight rests on machine ways 12, 14, in the process slightly compressing O-ring 60. A cushioning layer 31 (FIG. 2) of a low friction, non-stick material is provided on the underside of table 28 to shield the contacting surfaces from damage when the system is shut off or in case of sudden failure. The spacing between bearing surfaces 17 and 22 is slightly less then that between surfaces 19 and 20. Plunger 132 of pilot valve 90 is in retracted state, closing flow restriction 150 completely. Piston 158 of pilot valve 90 may have moved slightly upward off the abutment 160 in order to accommodate the upward movement of plunger 132 without damage to either the reference surface 162 or any component of the valve.

When the supply pressure pump 181 is activated, the following sequence of events occurs. First of all the hydraulic fluid fills both pressure equalization chambers 120 and 118 of the diaphragm controlled restrictor valve 80. The hydraulic fluid then flows through conduits 182 and 190, branching respectively into conduits 184 and 186 as well as 192 and 194. Conduits 184 and 192 supply the respective bearing pads 42 and 44 with the hydraulic fluid required to fill pockets 56, 58 and recesses 64, 66. Pilot valve 90 at this stage acts as a closed valve while flow restrictor 194 allows some flow according to the pressure built up at pad 44. Since pilot valve 90 is closed, the pressure at pad 42 will build up faster than that at pad 44, causing slide 28 to start lifting.

Because the hydraulic pressure in pockets 56 and 58 acts over a larger area than that of recesses 64 and 66, a net force across the bearing pads 42, 44 toward machine ways 12 results, which causes lands 82 and 84, as well lands 86 and 88, to seal against the machine ways. What little hydraulic fluid leaks across lands 82 and 84 is caught in grooves 72 and 74 to be conducted back to the hydraulic fluid reservoir.

On the outside of bearing pads 42, 44, on the side facing machine slide 28, the O-ring seals 60 and 62 prevent leakage of hydraulic fluid out of pockets 56 and 58.

During the initial pressurization phase, slide 28 is slightly lifted off machine ways 12 and 14 due to the greater hydraulic pressure of pad 42 over that of pad 44 explained above. Such slight lifting also causes pilot valve 90 to move in an upward direction as it is firmly attached to machine slide 28. The hydraulic fluid pressure now acts upon the top surface of plunger 132 urging it to stay in contact with reference surface 162. Thus, plunger 132 moves in a relative downward direction with respect to valve body 130 and machine slide 28. Such movement causes flow restriction 150 to open, permitting flow of hydraulic fluid through outlet bore 152 to return to the reservoir. With valve body 130 in a certain position relative to valve plunger 132, flow restriction 150 will be open just enough to maintain the fluid pressure within bearing pad pockets 56, 58 and recesses 64, 66, at that level which keeps machine slide 28 at a certain predetermined spacing with respect to machine way bearing surfaces 17 and 19. Thus, the precise spacing between bearing surfaces 17 and 22, and 19 and 20 may be adjusted by changing the positioning of plunger 132 with respect to valve body 130. Such adjusting may most easily be accomplished by means of spacer shims 142 installed between cover plate 144 of pilot valve 90 and machine slide 28.

As machine slide 28 moves upward relative to machine way 12 and 14, the opening of valve 90 permits some hydraulic fluid to bypass conduit 184 to flow through conduit 186, valve 90, and conduit 188 back to the hydraulic fluid reservoir. As pilot valve 90 opens, a pressure drop is experienced in conduits 186, 184, and 182. Such pressure drop is transmitted to the diaphragm controlled restrictor valve 80, causing diaphragm center land 122 to move in the direction of the lower pressured port 110, thereby narrowing flow restriction 116 causing less flow to bearing pad 42. At the same time flow restriction 114 is widened, allowing additional flow through outlet port 108 to bearing pad 44. This action of the diaphragm controlled restrictor valve 80 halts any further upward movement of machine slide 28 to stabilize it at a certain position with respect to machine way 12. The system has again reached an equilibrium state.

Upon the application of a force upon slide 28, a process of adjustment is initiated which essentially is a repetition of that described in conjunction with reaching the initial equilibrium. An application of downward load will cause machine slide 28 to move in a downward direction, causing the gap at flow restriction 150 of pilot valve 90 to decrease. The resultant increase in pressure in bearing pad 42 and conduit 186 is communicated via conduits 184 and 182 to diaphragm controlled restrictor 80.

Whereas upon force application the pressure in pocket 56 and recess 64 of bearing pad 42 increases, the pressure in pocket 58 and recess 66 of bearing pad 44 decreases because bearing surface 20 slightly moved downward away from machine way bearing surface 19. Such pressure reduction is communicated via conduit 192 and 190 to the other side of diaphragm controlled restrictor 80. A pressure differential therefore exists across diaphragm 100 within diaphragm controlled restrictor valve 80. The diaphragm central land 122 will, accordingly, move into the direction of lower pressure, causing additional flow through the higher pressured restriction 116 toward pad 42 exhibiting the higher pressure.

The increase in flow to pocket 56 and recess 64 of bearing pad 42 tends to lift machine table 28, thereby increasing the spacing between machine table bearing surface 22 and machine way bearing surface 17. At the same time, the gap of flow restriction 150 within pilot valve 90 increases until an equilibrium condition is again established.

Upon removal of a load from machine table 28 the process described above occurs in essentially reverse order to reestablish equilibrium. Because removal of a load will tend to move table 28 upwards, a pressure drop occurs in pocket 56 and recess 64 of bearing pad 42, while a slight pressure increase occurs in pocket 58 and recess 66 of bearing pad 44. At the same time plunger 132 of pilot valve 90 moves downward relative to valve body 130 opening flow restriction 150 and causing more hydraulic fluid to flow through restriction 150. As the pressure changes are communicated to both sides of the diaphragm controlled restrictor valve 80, central land 122 is caused to move into the direction of the conduit leading to bearing pad 42 thereby decreasing flow to it, while increasing flow to pocket 58 and recess 66 of bearing pad 44. Machine slide 28 will therefore be urged to move slightly in a downward direction until such spacing with respect to machine way 12 is reached that pilot valve 90 will again decrease its flow restriction 150 permitting some back pressure to be communicated to bearing pad 42 as well as the heretofore lower pressured side of the diaphragm controlled restrictor. The diaphragm central land 122 therefore returns to its normal position permitting only slight flow through pilot valve 90 and flow restrictor 194. The system has again reached an equilibrium state.

Stiffness of the System

The static and dynamic stiffness of a machine tool are of considerable importance. The static stiffness of the overall machine tool structure determines the accuracy of the machined workpiece while the dynamic stiffness of the overall machine tool structure determines its ability to perform free of chatter during cutting operations. It is essential that both static and dynamic stiffnesses be maintained at a high level by proper design of various structural elements.

Static stiffness design considerations are of great importance for hydrostatic bearing systems. Much emphasis is placed upon designing each element of a machine tool system to have the greatest practicable stiffness so that the system as a whole will not suffer from undue distortions and deflections. While such approach has led to reduced stiffness problems and therefore higher degrees of accuracy of machining, there nevertheless remains some distortion and deflection even in the best conventionally designed—and expensive—system. The bearing system according to the invention is capable of eliminating even the slightest of such deformation, thereby producing a machine tool system of extreme accuracy, at relatively low cost. Moreover the stiffness of the servostatic bearings according to the invention can be adjusted over a wide ranging scale, from positive to infinite to negative.

The distortions and deflections between a machine tool tip and a workpiece are due to a number of factors. First, the machine spindle 2 being mounted on a headstock 4 attached to a column 6, as shown in FIG. 1, for example, will bend as a cantilever beam. The extent of such bending will be a function of the extended length of the spindle 2 across the machine table 28. In addition to such bending, the spindle mounting 8 located within headstock 4, will tend to rotate to some degree in the direction of force application.

Second, the column 6 to which headstock 4 is attached is subject to torsional distortion as well as bending. Any torsional distortion will of course depend upon the type of cross-section and braces used as well as the locating of the headstock 4 along the height of column 6. The bending of the column, on the other hand, depends mainly upon the cross-sectional area moment of inertia of the column 6 and also on the operating height of spindle 2 over the base of column 6.

When all the factors combine during the actual operation of a machine tool, the result is deflection of the machine tool tip with respect to a work piece located on table 28. While, as pointed out above, proper design of the spindle, spindle mounting, headstock, and column may provide a system which has somewhat less deflection and distortion than other systems, it is virtually impossible to entirely eliminate such bending and twisting deflections using conventional design concepts.

It is this shortcoming which the bearing system according to the invention seeks to correct. The inventive bearing system utilizes the combination of the sensing properties of pilot valve 90, and the compensating properties of diaphragm controlled restrictor 80 working in a closed loop system to provide the bearing system with any desired stiffness. But it should be noted that it is not merely the inventor's intention to provide a bearing system giving machine slide 28 infinite stiffness with respect to machine ways 12 and 14 supporting such slide. Rather, it is the inventor's intention to provide a system having a variable stiffness as between machine slide 28 and the machine tool tip attached to spindle 180.

It should also be understood that the stiffness of an entire machine tool system may be controlled by a number of servostatic bearing systems according to the invention. The discussion uses a system between a table and a saddle only for purposes of simplifying the description. Thus, machine tool system stiffness may be controlled by the use of servostatic bearings, between, for example, the head and column, the table and saddle, and the saddle and bed, individually or in any combination thereof. Embodiments could also include radial bearings such as on a machine spindle and its quill.

Figure 7A:
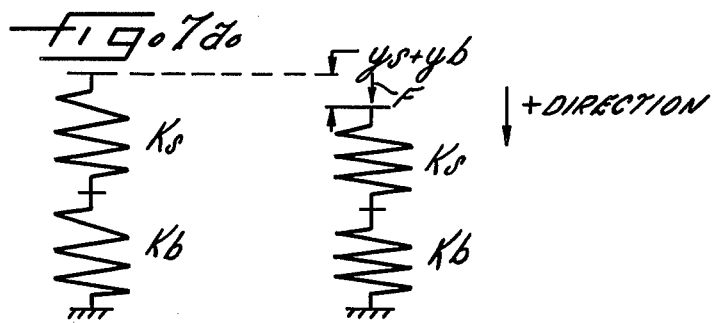
FIG. 7a is a schematic view of a spring model of the illustrative machine tool.

The stiffness of a machine tool system may be analyzed in terms of the behavior of a series of springs as force is applied upon them. In FIG. 7a, if the machine tool structure except the bearing system is visualized as a spring having a spring constant $K_s$, and the bearings are visualized as a spring having a spring constant $K_b$, with $Y_s$ being the amount of deflection of the machine structure and $Y_b$ the amount of deflection of the bearing system due to an imposition of force F, then the following relationships hold. The spring constant of the entire system, $K_t$, is defined as $$K_t = F/(Y_s + Y_b) \qquad (1).$$

And since, $$Y_s = (F/K_s) \text{ and } Y_b = (F/K_b),$$

substituting into equation (1) yields:

$$K_t = \frac{F}{\frac{F}{K_s} + \frac{F}{K_b}},$$

or, simplifying, $$K_t = (K_s K_b / K_s + K_b) \qquad (2).$$

It is clear from equation (1), that in order to obtain an infinitely stiff system, i.e. $K_t \rightarrow \infty$, $Y_b$ must in magnitude approach $Y_s$ and in direction oppose it. The closer the sum of $Y_s + Y_b$ approaches zero, the less will an entire machine tool system deflect.

Similarly, in terms of stiffness, and considering equation (2), it is clear that in order to achieve an infinitely high $K_t$, $K_b$ must in magnitude approach $K_s$ and in sign oppose it.

Figure 7B:
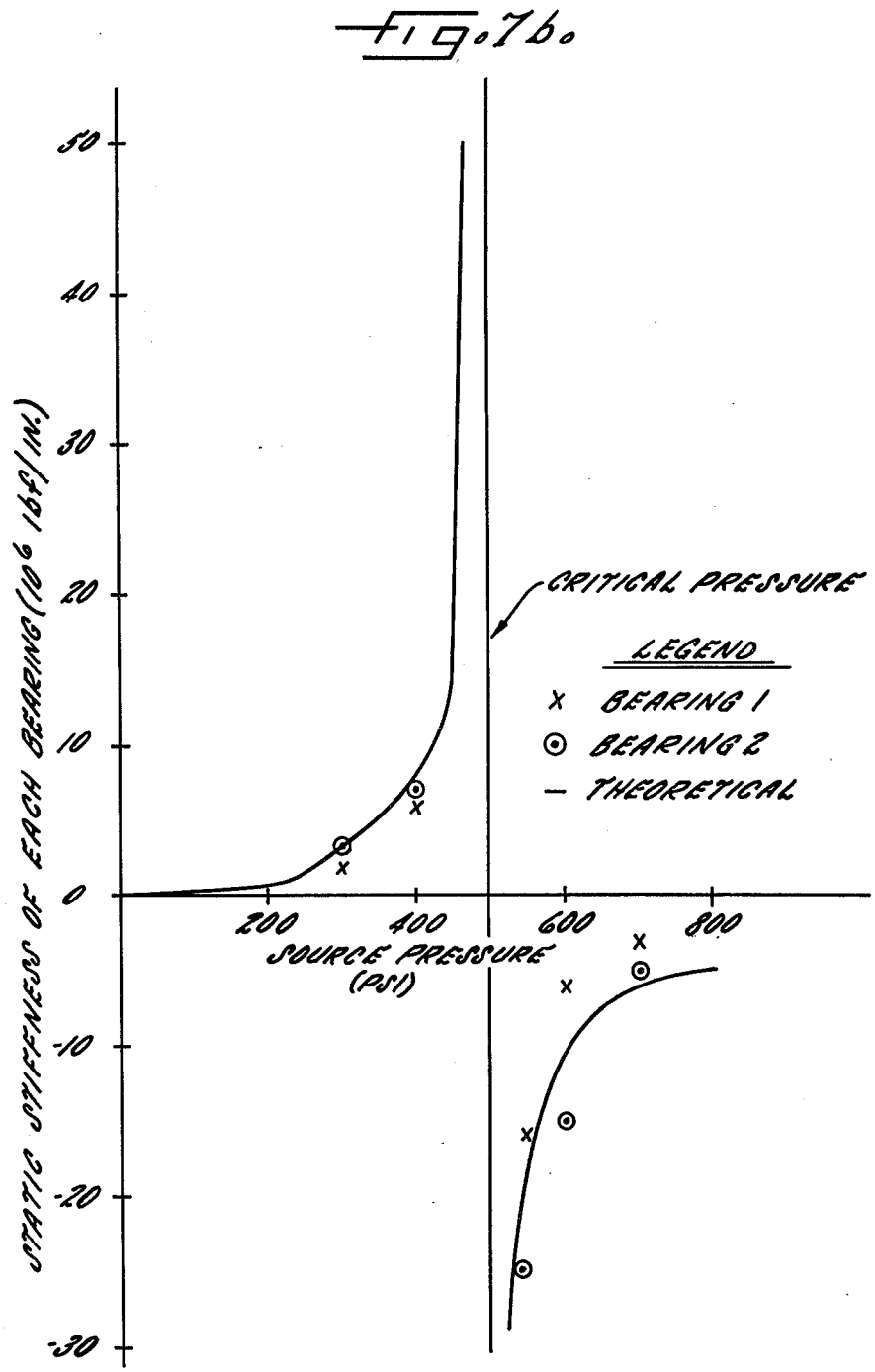
FIG. 7b shows a graph of stiffness properties of a servostatic bearing system according to the invention.

Investigating the bearing system of the invention, it was determined that given a particular set of parameters, the stiffness of the inventive bearings $K_b$ varied with the hydraulic supply pump pressure as shown in FIG. 7b. As can be seen, the stiffness of the system tested increased with increasing source pressure, reaching, in the limit, infinite stiffness at a certain critical source pressure determined to lie between 500 and 525 psi. When exceeding such pressure the stiffness of the bearings proved to be negative, increasing in a positive direction with increasing pressure over the range tested.

It is apparent that a particular desired static stiffness of the bearing system, positive or negative, may be chosen merely by adjusting the source pressure to a certain value. If it were, for example, desired that the bearing be infinitely stiff a source pressure between 500 and 550 psi would be chosen. At such magnitude, any force application within normal machine tool load limits would not deflect the machine table by any appreciable amount.

More importantly, in order to achieve infinite stiffness for an entire machine tool system, it is only necessary to compensate for the static stiffness of the machine tool structure except the bearings. If it were for example, 10 × 10⁶ lbf./in., then infinite system stiffness may be achieved simply by adjusting the source pressure of the bearings to be approximately 600 psi, resulting in a bearing stiffness of $-10 \times 10^6$ lbf./in. The positive deflection of the machine tool structure components is exactly offset by the negative deflection of the bearings. The tool tip therefore does not deflect by any amount relative to the work piece as force is applied. Extreme accuracy of machining results.

It is to be noted that the stiffness response indicated in FIG. 7b is characteristic only of a system operating under the parameters as tested. The response in general is a function primarily of the configuration of the diaphragm within the diaphragm controlled restrictor valve. Thus, the thickness and geometry thereof affecting the diaphragm's flexibility, and the construction of the central land 122 (FIG. 5) affecting the response characteristics to pressure changes in the pad pockets and recesses, greatly influence the precise pressure-stiffness relationship. Other constructional features of the bearing system also bear upon the stiffness characteristics.

The Lift Bladder

In order to facilitate easy change-out of bearing pads, a means is provided by which table 28 is slightly lifted off slide ways 12 and 14, or slightly moved sideways in order to provide sufficient spacing between the bearing surfaces. It consists of a bladder 191 which, in an uninflated state, is inserted into bladder slots 190 (FIG. 2), and is thereupon inflated.

The bladder slots 190 are machined into certain bearing surfaces of the table. Thus, with reference to FIG. 2, slots are provided to move the table vertically and horizontally off each slideway.

One slot each is located in table surfaces 195. Another slot is located in surface 32 which faces surface 30 located at the outside of support way 12. Yet another slot is located at either the corresponding surface of slideway 14, or, as shown for demonstration purposes in FIG. 2, on the opposite side of the same slideway 12. It is understood of course that the table configuration must be such that there is a lower center section between slideways 12 and 14 before the latter slot may be utilized.

The bladder 191 may consist of any sufficiently strong material. The preferred embodiment consists of copper. As indicated in FIG. 9, the bladder has a roughly oval cross-section, and is closed on both ends by plugs 192. Through the plug at one end extends a tubing nipple 194, which provides a means of supplying air or another suitable inflation medium to the inside of bladder 191.

In order to insert new bearing pads between the bearing surfaces, the table must be lifted slightly so as to provide sufficient spacing to insert the new bearing pads without damaging either the low friction backing on one side or the O-rings on the other side. In order to provide such separation, bladder 191 is inserted into the appropriate slot in the table, and is thereupon inflated. The hydraulic pressure within the bladder is confined on three sides by the slot, and therefore is allowed to expand only against the table, forcing it away from the bearing surface of the machine way. The increased spacing obtained thereby facilitates easy removal and insertion of bearing pads.

The Bearing Pad Cartridge

Because most machine tables are supported on each slideway by more than one pair of bearing pads, the installation and removal of the pads, if installed and removed individually, requires not only undue amounts of time, but is also quite difficult because of the necessity of keeping the seals intact throughout the installation process. In order to save much of such installation time, and to assure the lowest possible rate of seal failure, a bearing pad cartridge is described, which is assembled in package form independent of the assembly of the machine tools, and is thereafter simply inserted between the bearing surfaces as a unit. One cartridge bar may hold as many bearing pads as may be required by the particular machine table or slide.

FIG. 9 contains a side elevational view of a bar 200. Its width is approximately that of a bearing pad. A number of recesses 202 are machined into the bar, evenly spaced out along its length. The recesses have a length slightly longer than a bearing pad, just sufficient to accommodate a pad.

The pad is installed into the pad recess 202 with the side containing pocket 56, 58 surrounded by the O-ring 60, 62 facing recess 202. The pad is loosely attached to the recess by means of washers 204 fastened to the bar 200 by bolts 206. The washers 204 extend into a cutout 208 at each end of the bar. The cutout is of slightly larger width than the width of the washer, so that the bearing pad is permitted to travel very slightly in a vertical direction, as is required for the operation of the bearing system.

The bar cartridge 200 containing the bearing pads is inserted as a unit into receiving groove 202 of table 28. The receiving groove has a length corresponding to that of the bearing bar catridge, so that when fully inserted, one end is just even with the face wall of the table. The cartridge is inserted with the cartridge bar surface facing groove 202 of table 28. It is held in place by installing a cover plate 212 (FIG. 1) onto the end face of the table across groove 202.

The actual operation of bearing pads 42, 44 is not in any way altered from that described above. The bearing bar itself becomes effectively a part of table 28, and the bearings act upon the table through the bar.

We claim as our invention:
1. A hydraulically sealed, variable stiffness servostatic bearing system comprising, in combination:
   a. a pair of oppositely acting bearing pads, each said pad being located between and fixed to one of two relatively movable surfaces and having sealed fluid retaining spaces facing said relatively movable surfaces;
   b. means including a conduit for supplying hydraulic fluid at a given pressure to said fluid retaining spaces, whereby the hydraulic fluid within said spaces supports a substantial part of an external load imposed upon said relatively movable surfaces;
   c. means for sensing the spacing between said relatively movable surfaces including:
      i. a valve connected to the fluid supply conduit in parallel with a first pad of a pair of oppositely acting pads,
      ii. an external fluid flow restrictor connected to the fluid supply conduit in parallel with the second pad of a pair of oppositely acting pads,
      iii. a plunger for sensing the bearing surface spacing across said first pad,
      iv. said plunger being supported within a valve housing attached to one of the relatively movable surfaces and in contact with a reference surface reflecting the position of the other movable surface,
      v. said plunger being adapted to control the position of the valve which in turn controls the hydraulic fluid supply to said pads according to the spacing between said surfaces, whereby when the sensed spacing is below a predetermined value the valve closes, directing more hydraulic fluid to the pad located between the inadequately spaced surfaces, and when the spacing exceeds said predetermined value the valve opens, decreasing the fluid supply to the pad located between the excessively spaced surfaces;
   d. fluid distribution valve means interposed in said supply conduit between the hydraulic fluid supply means and the pads and spacing sensing means, for distributing hydraulic fluid flow from the supply means to the respective pads and sensing means, including:
      i. a double acting diaphragm creating two flow restrictions within a valve housing,
      ii. said flow restrictions communicating with the fluid retaining spaces of each of an oppositely acting pair of bearing pads,
      iii. the diaphragm being adapted to cause increased flow to the fluid retaining spaces of the pad exhibiting the higher pressure of the oppositely acting pair of bearing pads, while simultaneously restricting flow to the fluid retaining spaces of the pad exhibiting the lower pressure; and
   e. pressure regulating means to control the pressure of the hydraulic fluid supply entering the fluid distribution valve means, whereby adjustments in said pressure cause changes in the stiffness of said bearing system.

2. A servostatic bearing system as defined in claim 1, and utilizing more than one bearing pad pair wherein the pads are mounted on a bar which as a unit is inserted between said relatively movable surfaces.

3. The servostatic bearing system defined in claim 2, wherein one of said two relatively movable surfaces is defined by a machine tool slide.

4. The servostatic bearing system defined in claim 1, wherein one of said two relatively movable surfaces is defined by a machine tool slide.

5. The servostatic bearing system defined in claim 4 wherein the stiffness of said bearings is adjustable from positive to infinite to negative.

6. The servostatic bearing system defined in claim 4, and which further includes a hollow, inflatable body which is inserted in a space between any two relatively movable surfaces and is inflated so as to separate said surfaces sufficiently for removing and inserting bearing pads.

7. The servostatic bearing system defined in claim 1 utilized in a machine tool wherein the adjustable variable stiffness capability of said bearing system is utilized to adjust the overall stiffness of the entire machine tool, as between tooltip and workpiece, to any desired value.

8. The servostatic bearing system defined in claim 1, wherein said fluid distribution valve means is a diaphragm controlled restrictor valve comprising, in combination:
   a. a double acting diaphragm creating two flow restrictions within a valve body;
   b. a central land on said diaphragm rising above one side of said diaphragm, the other side being flat;
   c. that side of the diaphragm having the raised central land facing a flat section of valve body at the center of which is a hydraulic fluid port; and
   d. said flat diaphragm side facing a section of valve body having a raised portion, at the center of which is a hydraulic fluid port.

9. In a hydraulically sealed, variable stiffness servostatic bearing system, a pilot valve, connected to a hydraulic fluid supply, for sensing the spacing between two relatively movable surfaces, comprising, in combination:
   a. a valve housing attached to the first one of said relatively movable surfaces;
   b. a plunger slideably supported within said valve housing, one end of said plunger being in contact with a reference surface reflecting the position of the second one of said relatively movable surfaces;
   c. a flow restriction within said valve housing formed by the other end of said plunger acting upon a bore, whereby movement of the plunger in response to a change in the spacing between the two relatively movable surfaces causes a change in hydraulic fluid flow through said bore.

* * * * *